(12) United States Patent
Geantil et al.

(10) Patent No.: US 12,328,017 B2
(45) Date of Patent: Jun. 10, 2025

(54) SYSTEM AND METHOD FOR CHARGE BALANCING A BATTERY PACK OVER TIME

(71) Applicant: Flux Power, Inc., Vista, CA (US)

(72) Inventors: Paul Thomas Geantil, San Diego, CA (US); Jaime Andrew Lerma, Murrieta, CA (US)

(73) Assignee: FLUX POWER, INC., Vista, CA (US)

( * ) Notice: Subject to any disclaimer, the term of this patent is extended or adjusted under 35 U.S.C. 154(b) by 874 days.

(21) Appl. No.: 17/531,268

(22) Filed: Nov. 19, 2021

(65) Prior Publication Data

US 2022/0166228 A1   May 26, 2022

Related U.S. Application Data

(60) Provisional application No. 63/116,846, filed on Nov. 21, 2020.

(51) Int. Cl.
*H02J 7/00*        (2006.01)
(52) U.S. Cl.
CPC .......... *H02J 7/0016* (2013.01); *H02J 7/0048* (2020.01); *H02J 7/00712* (2020.01); *H02J 7/005* (2020.01)
(58) Field of Classification Search
CPC .... H02J 7/0016; H02J 7/0048; H02J 7/00712; H02J 7/005
See application file for complete search history.

(56) References Cited

U.S. PATENT DOCUMENTS

| | | | |
|---|---|---|---|
| 7,928,735 B2 | 4/2011 | Huang et al. | |
| 8,004,246 B2 | 8/2011 | Liu et al. | |
| 8,219,333 B2 | 7/2012 | Li | |
| 8,723,481 B2 | 5/2014 | Zhang | |
| 8,872,478 B2 | 10/2014 | Li | |
| 8,977,874 B2 | 3/2015 | Rabii | |
| 9,160,191 B2 | 10/2015 | Kim | |
| 9,430,021 B2 | 8/2016 | Lu et al. | |
| 9,722,282 B2 | 8/2017 | Schmiegel | |
| 10,136,482 B1* | 11/2018 | Zhang | H05B 45/3575 |
| 10,409,355 B2 | 9/2019 | Flores Assad et al. | |
| 2002/0195994 A1* | 12/2002 | Perelle | B60L 58/22 |
| | | | 320/116 |
| 2005/0001625 A1 | 1/2005 | Ashtiani | |
| 2006/0022646 A1* | 2/2006 | Moore | H02J 7/0029 |
| | | | 320/150 |
| 2006/0253237 A1* | 11/2006 | Dannenberg | F02D 31/001 |
| | | | 701/1 |

(Continued)

*Primary Examiner* — Drew A Dunn
*Assistant Examiner* — Pamela J Jeppson
(74) *Attorney, Agent, or Firm* — Harness, Dickey & Pierce, PLC

(57) ABSTRACT

A system and method for controlling charging of a plurality of battery cells includes a cell voltage detector determining a top-of-charge voltage for each of the plurality of battery cells. An imbalance circuit compares the top-of-charge voltage for each of the plurality of battery cells to an imbalance threshold and determines a first battery cell of the plurality of battery cells is above the imbalance threshold by an imbalance amount. A shunt control circuit determines an imbalance shunt time for the first battery cell based on the imbalance amount and controls discharging the first battery cell for the imbalance shunt time toward the imbalance threshold.

16 Claims, 13 Drawing Sheets

(56) References Cited

U.S. PATENT DOCUMENTS

| | | | |
|---|---|---|---|
| 2010/0033128 A1* | 2/2010 | Densham | H02J 7/0016 |
| | | | 320/116 |
| 2010/0121587 A1 | 5/2010 | Vian | |
| 2011/0109269 A1* | 5/2011 | Li | H02J 7/0016 |
| | | | 320/116 |
| 2011/0316483 A1* | 12/2011 | Zhang | H01M 10/486 |
| | | | 320/118 |
| 2013/0127611 A1 | 5/2013 | Bernstein | |
| 2014/0045024 A1 | 2/2014 | Waters | |
| 2014/0199570 A1* | 7/2014 | Cho | H01M 10/488 |
| | | | 429/93 |
| 2014/0266227 A1 | 9/2014 | Harman | |
| 2016/0159240 A1 | 6/2016 | Tseng et al. | |
| 2017/0021738 A1* | 1/2017 | Brochhaus | H02J 7/0014 |
| 2021/0013554 A1 | 1/2021 | Proebstle | |
| 2021/0083486 A1 | 3/2021 | Klicpera | |
| 2021/0094435 A1 | 4/2021 | Rechkemmer et al. | |
| 2021/0181256 A1 | 6/2021 | Kawamura | |

* cited by examiner

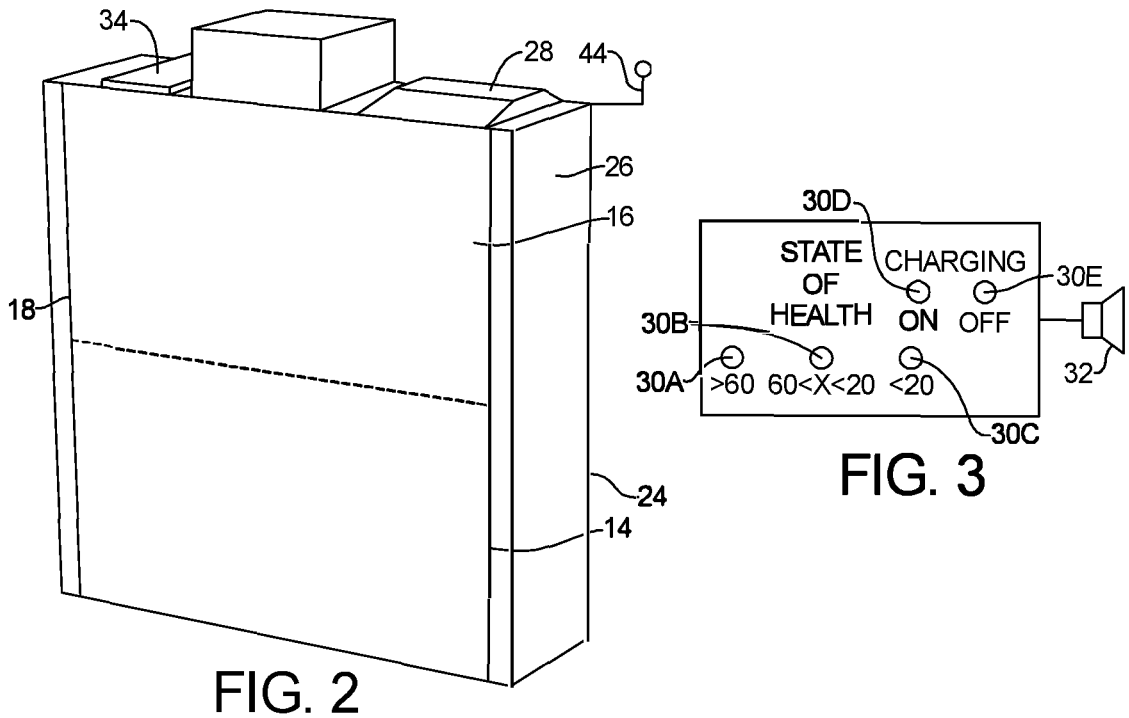
FIG. 2
FIG. 3
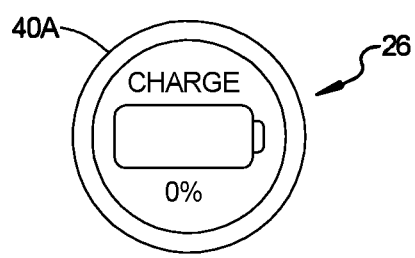
FIG. 4A
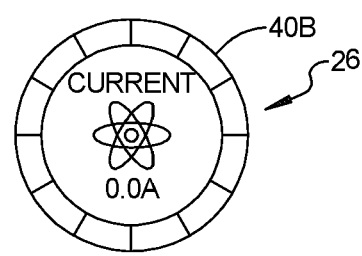
FIG. 4B
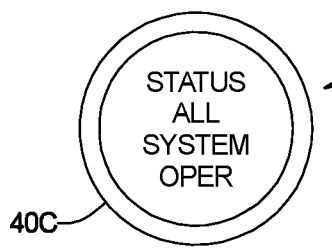
FIG. 4C
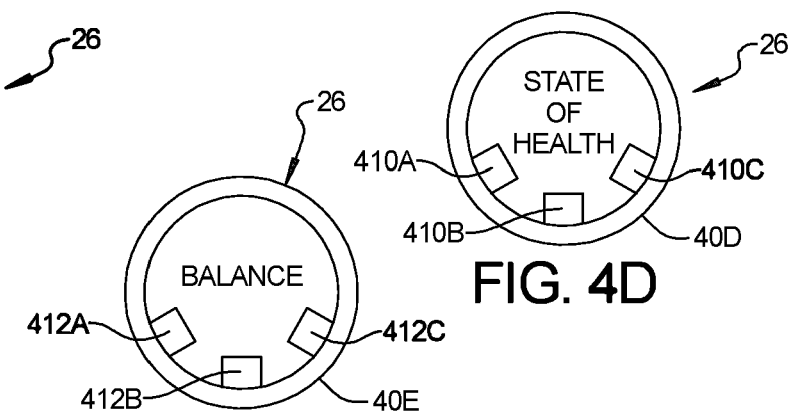
FIG. 4D
FIG. 4E

| LIFE CYCLE ESTIMATION | |
|---|---|
| AVERAGE DEPTH OF CHARGE | ESTIMATED CYCLE LIFE |
| 100% | 1000 |
| 95% | 1200 |
| 90% | 1300 |
| 85% | 1500 |
| 80% | 1600 |
| 75% | 1850 |
| 70% | 2050 |
| 65% | 2500 |
| 60% | 3000 |
| 55% | 3500 |
| 50% | 4000 |
| 45% | 4700 |
| 40% | 5800 |
| 35% | 6500 |
| 30% | 10000 |
| 25% | 10450 |
| 20% | 22000 |
| 15% | 45000 |
| 10% | 100000 |
| 5% | 300000 |

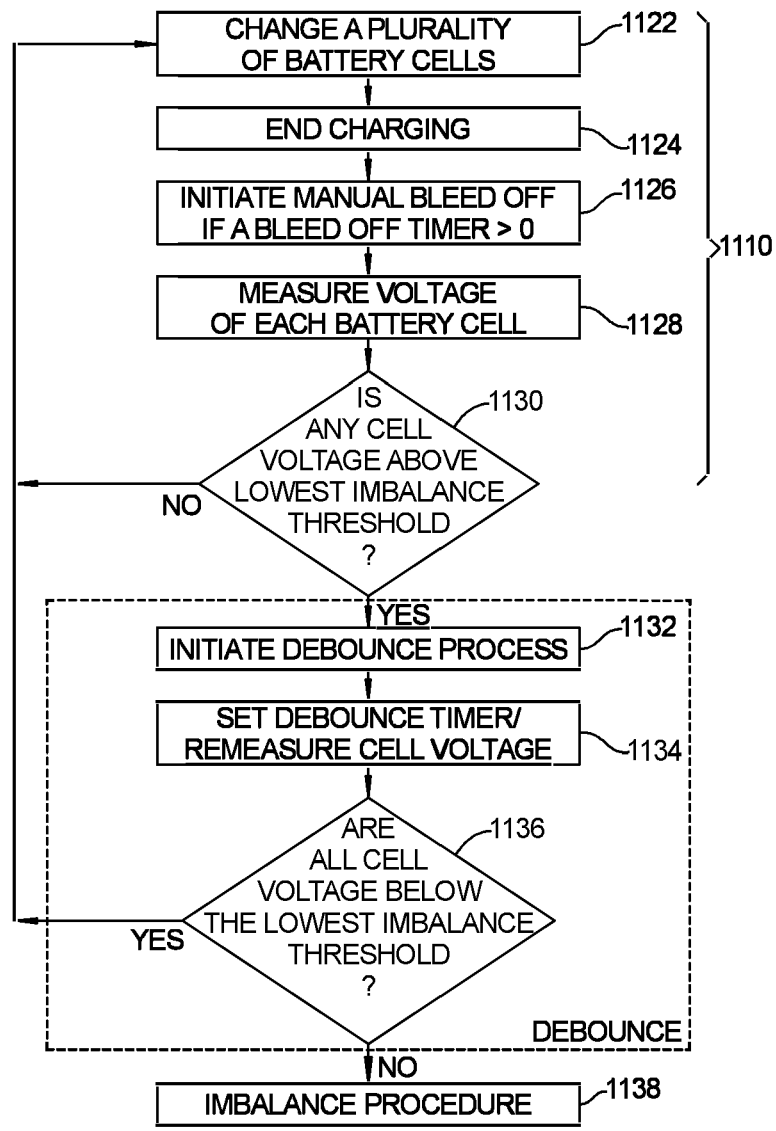

SYSTEM AND METHOD FOR CHARGE BALANCING A BATTERY PACK OVER TIME

CROSS-REFERENCE TO RELATED APPLICATION

This application claims priority to U.S. Provisional Application No. 63/116,846, filed Nov. 21, 2020. The above-identified patent application is incorporated herein by reference in its entirety.

FIELD

The present disclosure relates to a system and methods for charging a battery and, more particularly, to a system and method for charge balancing a battery pack over time.

BACKGROUND

This section provides background information related to the present disclosure which is not necessarily prior art.

Many industries are now incorporating rechargeable batteries for operating the devices. The use of rechargeable batteries for automotive-type vehicles is increasing. In the materials handling business, the use of batteries for operating the vehicles is well known. Many materials handling devices are used indoors and therefore the use of internal combustion engine is not desirable.

Material handling devices are often used in factories and warehouses. Many such facilities operate with multiple shifts. Typical material handling devices use lead acid batteries. Lead acid batteries have significant drawbacks including their relative size compared to the amount of energy stored. Lead acid batteries are also not suitable for fast charging. Lead acid batteries are also known to overheat during charging. Another drawback to lead acid batteries is the life cycle is typically very short and thus increases the overall expense due to regular battery replacement. Because of the hazards during charging, special facilities are established to provide a safe environment for charging.

Lithium-ion batteries offer higher sustained power with less voltage drop off than lead acid batteries. Lithium-ion batteries do not have the potential to leak acid or emit combustible gas emissions. Typically, lithium-ion batteries are lower cost to operate because fewer replacements are required. Multiple-shift applications for the batteries also do not require battery swapping between shifts. Overall, lithium-ion batteries reduce the amount of energy used in the neighborhood of 50%. Even with the basic advantages of lithium ion, further increasing the life of a battery is important to increase the overall return on the investment in the new batteries.

SUMMARY

This section provides a general summary of the disclosure, and is not a comprehensive disclosure of its full scope or all of its features. The present system provides a relatively simple method for setting the state of charge to which the battery is charged. In another aspect, the state of health of the battery is used to provide an indication of the remaining life of a battery. In another aspect, the system uses predictive quantum balancing for the cells within a battery pack to balance charging of the cells therein.

In one aspect of the disclosure, a method for operating a battery system includes storing battery charge usage data for a plurality of days in a memory, obtaining usage data for a current day based on a past corresponding day, comparing the usage data for the current day to a plurality of threshold, when the usage data is less than a first usage threshold, setting an operating state of charge range for the day to a first state of charge range, when the usage data is between the first usage threshold and a second usage threshold, setting the operating state of charge range for the day to a second state of charge range greater than the first state of charge range, when the usage data is greater than the second usage threshold, setting the operating state of charge range for the day to a third state of charge range greater the second state of charge range, and charging and discharging the battery system based on the state of charge range during the day.

In another aspect of the disclosure, a battery system includes a memory storing battery charge usage data for a plurality of days. The system further includes a state of charge circuit programmed to obtain usage data for a current day based on a past corresponding day from the battery charge usage data, compare the usage data for the current day to a plurality of thresholds, when the usage data is less than a first usage threshold, set an operating state of charge range for the day to a first state of charge range, when the usage data is between the first usage threshold and a second usage threshold, set the operating state of charge range for the day to a second state of charge range greater than the first state of charge range, when the usage data is greater than the second usage threshold, set the operating state of charge range for the day to a third state of charge greater the second state of charge range and charge and discharge the battery system based on the state of charge range during the day.

In another aspect of the disclosure, a method of determining a battery condition includes determining a depth of discharge prior to charging a battery, determining an average depth of discharge over a time period, determining a cycle life estimation based on the average depth of discharge, determining a state of health of the battery based on the cycle life estimation and displaying a state of health indicator on a display.

In another aspect of the disclosure, a system of determining a battery condition includes a discharge circuit determining a depth of discharge prior to charging a battery and determining an average depth of discharge over a time period. A cycle life estimation module determines a cycle life estimation based on the average depth of discharge. A state of health determination circuit determines a state of health of the battery based on the cycle life estimation. A display displays a state of health indicator.

In yet another aspect of the disclosure, a method of controlling charging of a plurality of battery cells includes determining a top-of-charge voltage for each of the plurality of battery cells, comparing the top-of-charge voltage for each of the plurality of battery cells to an imbalance threshold, determining a first battery cell of the plurality of battery cells is above the imbalance threshold by an imbalance amount, determining an imbalance shunt time for the first battery cell based on the imbalance amount and discharging the first battery cell for the imbalance shunt time toward the imbalance threshold.

In still another aspect of the disclosure, a system for controlling charging of a plurality of battery cells includes a cell voltage detector determining a top-of-charge voltage for each of the plurality of battery cells. An imbalance circuit compares the top-of-charge voltage for each of the plurality of battery cells to an imbalance threshold and determines a first battery cell of the plurality of battery cells is above the imbalance threshold by an imbalance amount. A shunt control circuit determines an imbalance shunt time for the first battery cell based on the imbalance amount and controls discharging the first battery cell for the imbalance shunt time toward the imbalance threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 2 is a perspective view of a battery pack.

FIG. 3 is a first example of a display.

FIGS. 4A-4E are examples of displays according to the present disclosure.

FIG. 11B is a detailed flowchart of steps 1110 and 1112 of FIG. 11A.

FIG. 11C is a chart for determining the imbalance level.

DETAILED DESCRIPTION

Specific examples will now be described more fully with reference to the accompanying drawings.

The following description is set forth for use in a lithium iron phosphate (LiFePO4). However, the teachings set forth herein may be suitable for use with other types of battery chemistry. Further, the teachings set forth herein are described relative to a vehicle. However, the use of the teachings set forth herein may be applied to other types of battery systems including, but not limited to, automotive and home solar charger battery arrays.

Figure 1:
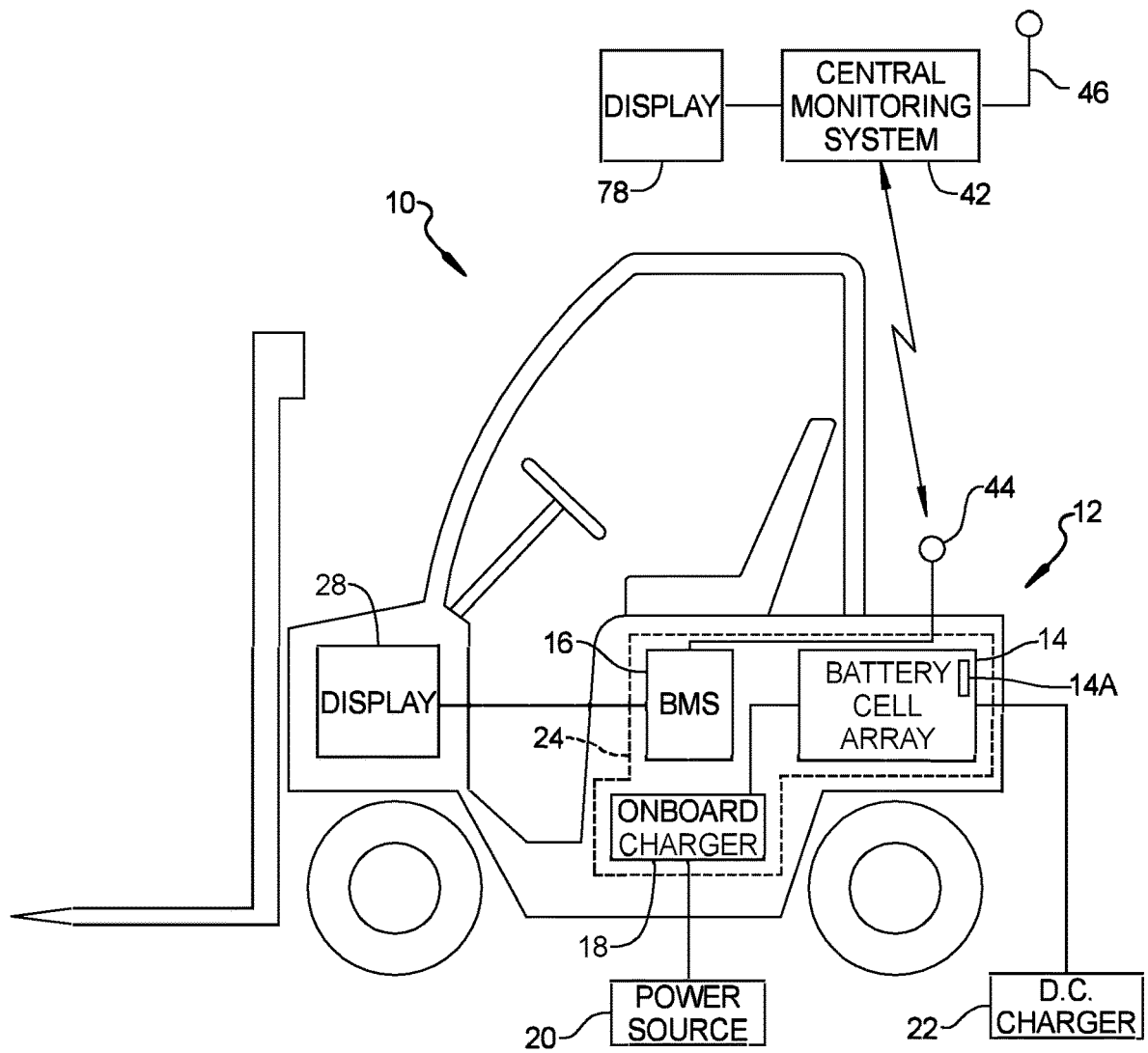
FIG. 1 is a high lever block diagrammatic view of a charging system relative to a vehicle.

Referring now to FIG. 1, a vehicle 10 is illustrated as a materials handling device, such as forklift. The vehicle 10 has a battery system 12 that includes a plurality of battery cell array 14 comprised of a plurality of battery cell 14A, one of which is shown. As mentioned above, the battery cells 14A may be of various types of chemistry including but not limited to lithium iron phosphate. In addition, as mentioned above, the present system may be disposed in other types of battery operated systems outside of the vehicle 10. The number of battery cells 14A within the plurality of battery cell arrays 14 may vary depending upon the application and the use of the vehicle. The charging of the battery cells 14A and the monitoring of the battery cells 14A is performed by a battery management system (BMS) 16.

An on-board charger 18 may also be included in the vehicle. The on-board charger 18 controls the charging together with the battery management system 16. The on-board charger 18 is coupled to a power source such as an alternating current power source from a building.

A direct current charger 22 may also be used to charge the battery cells 14 rather than the on-board charger 18. The direct current charger 22 may be in a fixed location in the building to perform charging. The type of charging, such as the amount of voltage and current provided to the battery cell arrays 14, may vary depending upon the technology and desired operation of the vehicle. Fast charging with a high direct current voltage may be performed.

Referring also now to FIG. 2, the plurality of battery cell arrays 14, the battery management system 16 and the on-board charger 18 may be incorporated into a battery pack 24 having a battery pack housing 26. The battery pack housing 26 may have a display 28 disposed thereon. The display 28 may include a simple display such as an LED display.

Referring now also to FIG. 3, one example of an LED display having a plurality of indicators 30A, 30B and 30C. The indicators 30A-30C may be light emitting diodes having different colors (or the same color) or another type of light or indicator. In this example, the indicators 30A-30C indicate a state of health status. Indicator 30A, when illuminated, indicates greater than 60% state of health, indicator 30B indicates between 60% and 20% state of health and indicator 30C indicates the state of health is less than 20%. Other indicators, such as indicator 30D, may indicate that charging is started while indicator 30E indicates the charging is not occurring. Of course, other types of displays such as liquid crystal displays may be used.

The display 28 may also include an audible indicator 32, such as speaker or buzzer, to provide warnings or audible feedback relative to the various processes within the battery pack 24.

A connector 34 may be used to couple the battery pack 24 to an external power source 20 or charger 22. The connector 34 may also be used to communicate with other devices such an external display such as the display within the vehicle 10.

Referring now to FIGS. 4A-4D, the display 28 may also be used to provide further information. In FIG. 4A, a screen display 40A provides an indicator of the amount of charge left within the battery pack.

In FIG. 4B, the current provided to the battery pack is indicated in the screen display 40B.

In FIG. 4C, screen display 40C indicates the status of various systems.

In FIG. 4D, screen display 40D indicates levels 410A, 410B and 410B of the state of health of the battery pack 24. The levels 410A, 410B and 410 correspond to a portion of the display 40D and may use various colors, numbers, letters, symbols or other differentiators to denote the state of health.

In FIG. 4E, screen display 40E indicates levels 412A, 412B and 412B of the state of balance of the plurality of cells of the battery pack 24. The levels 412A, 412B and 412C correspond to a portion of the display 40D and may use various colors, numbers, letters, symbols or other differentiators to denote the state of balance.

In FIGS. 4A-4E, the screen displays 40A-40E may be displayed at the battery pack 24. However, such screen displays may also be communicated to a central monitoring system 42 and displayed on screen display 28 associated therewith. The central monitoring system 42, illustrated in FIG. 1, may wirelessly communicate with the battery pack 24 through an antenna 44 associated with the battery pack 24 and an antenna 46 associated with the central monitoring system 42. The central monitoring system 42 may be used to manage a fleet and collect data for a plurality of vehicles within a fleet.

Figure 5:
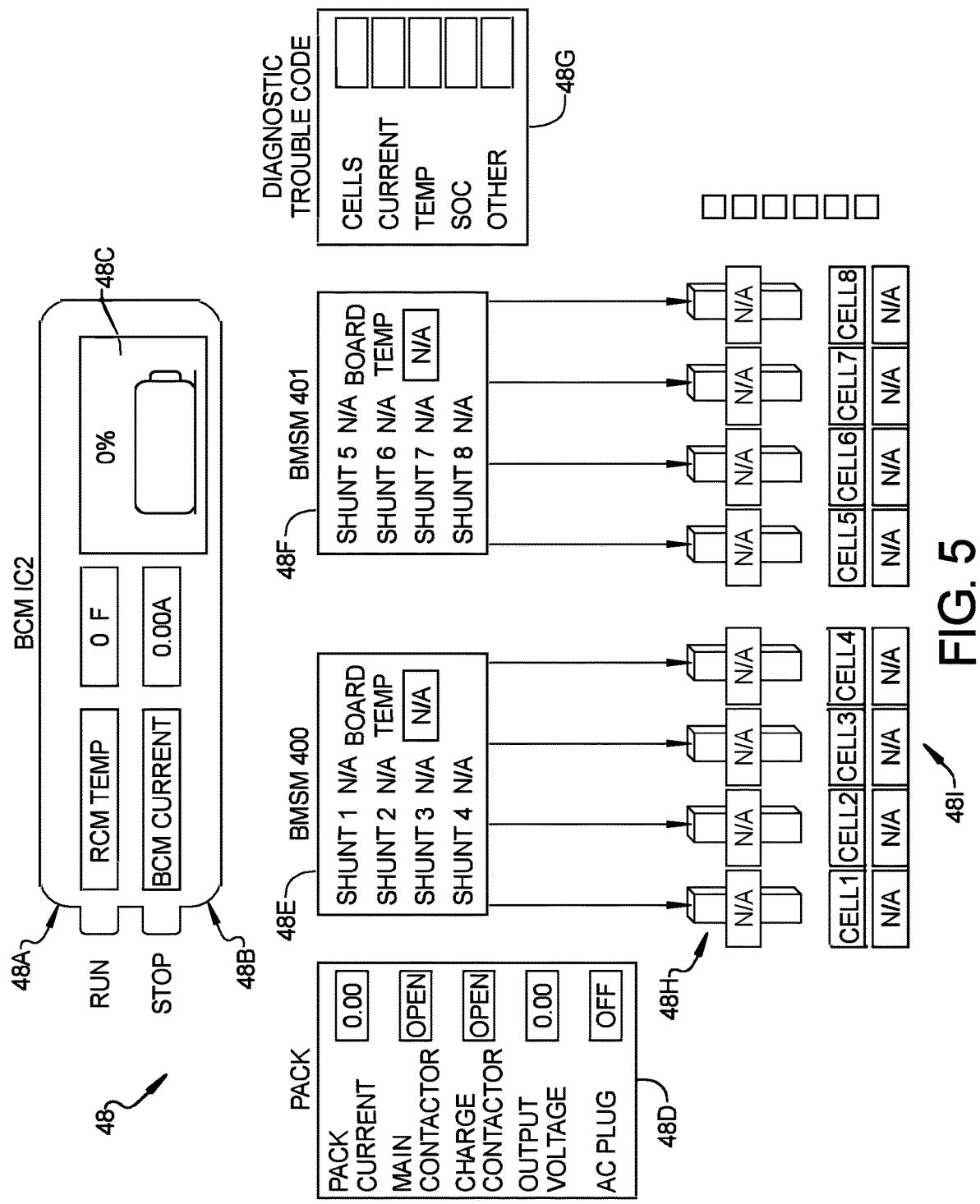
FIG. 5 is a more detailed example of a complex display according to the present disclosure.

Referring now also to FIG. 5, another example of a screen display 48 is set forth. Screen display 48 may also be displayed on a display 28 within the vehicle 10. This screen display 48 includes a temperature indicator 48A, a current indicator 48B and a charge indicator 48C that indicates the temperature, current and charge of a battery pack. A pack indicator 48D indicates a pack voltage, a main contactor status of open or closed, a charge contactor status of open or closed, the output voltage and whether an AC plug is coupled thereto. A first shunt status indicator 48E generates the shunt status and the board temperature of the cells within a battery pack. A second shunt indicator 48F provides the status of a second set of shunts and the board status associated therewith. A diagnostic trouble code indicator 48G provides the status, such as a color status, of various diagnostic conditions including cells, current, temperature, the state of charge or other diagnostics.

A cell voltage indicator 48H may provide an indication for the voltages at each of the individual cells within the battery pack. A temperature indicator 48I may provide a temperature of the individual cells on the display 28.

A communication indicator 48J may be used to display the communications through the system.

Figure 6:
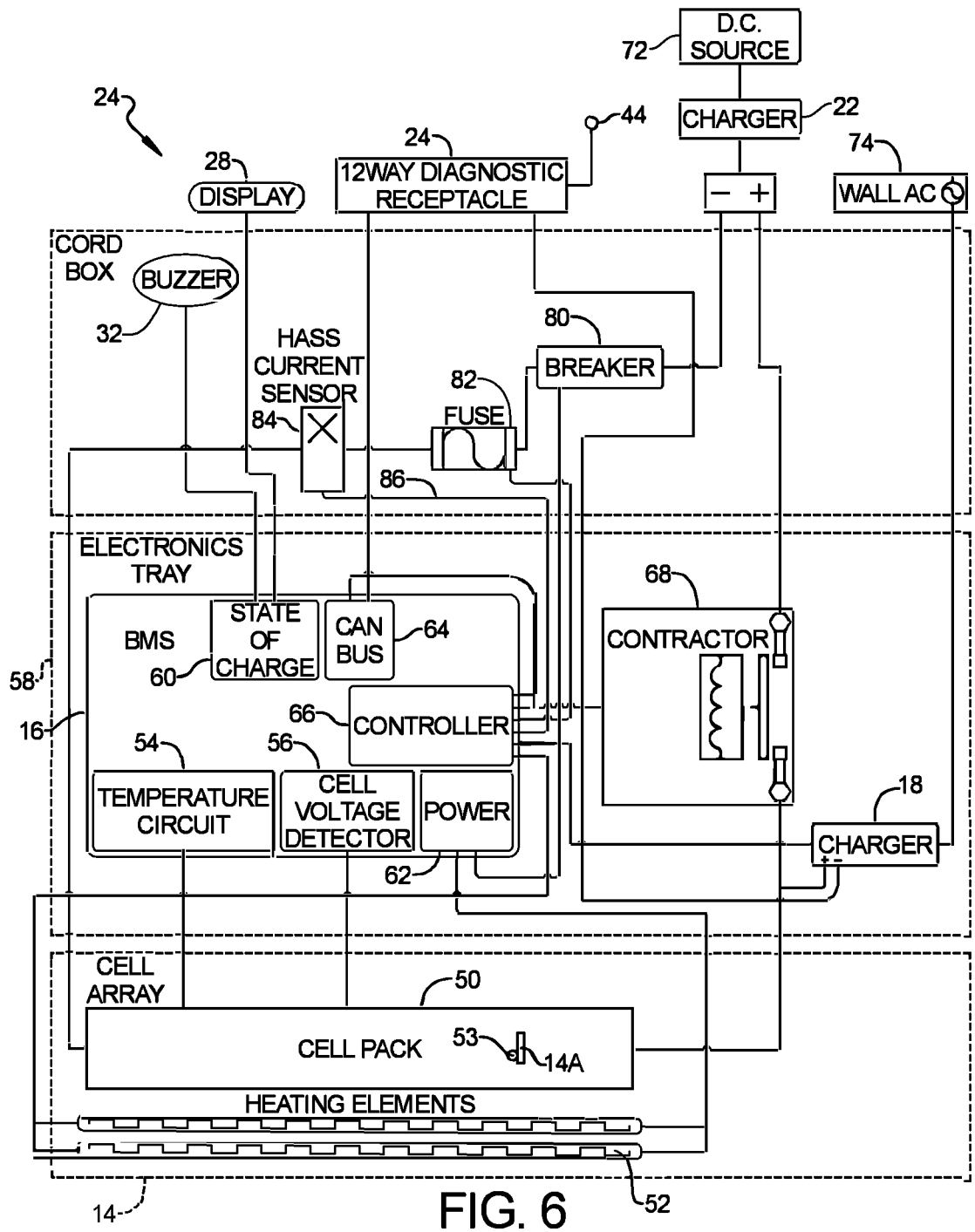
FIG. 6 is a high-level schematic view of the battery management system.

Referring now to FIG. 6, a high-level block diagrammatic view of a battery pack 24 is set forth. In this example, the battery cell array 14 has a cell pack 50 with a plurality of cells 14A disposed therein. The cell pack 50 may be disposed adjacent to heating elements 52 that are used to heat the cells in the battery cell array 14 when used in a cold climate application. The heating elements 52 may be an optional feature. The cell pack 50 may have various arrangements. The cells may be wired together into blades, banks, modules and buckets. Thermistors 53 may be disposed between each of the cells 14A to keep track of the cell temperature with the temperature circuit 54. A cell voltage detector 56 is attached to the terminal ends and used to monitor the voltage of each of the cells 14A. The monitoring of the thermistors 53 and the cell voltage detectors 56 are performed at the battery management system 16, which is part of the electronics tray 58.

A power module 60 is used for powering the heating elements 52. A statement of charge module 62 determines a state of charge as will be described in more detail below. The statement of charge module 62 may be coupled to the audible indicator 32 or the display 28.

The battery management system 16 is also in communication with a controller area network bus 64 that communicates between various components of the battery pack 24.

The controller 66 is used for controlling the operation of a contactor 68. The contactor 68 is used to couple a DC source 72 to the cell pack 50. The cell pack 50 may also be in communication with a charger 18 that is disposed within the electronics tray. The contactor 68 may have a shunt duty cycle that opens the contactor for a time period while connecting a shunt resistor to the battery cell for draining charge. The charger 18 may couple the cell pack 50 to an AC source 74 to charge the cell pack 50. The charger 18 may have an AC to DC converter for changing the alternating current to a direct current for charging. In this manner, the contactor would be opened and thus the DC source 72 would not be coupled to the cell pack for charging. This allows the cell pack to be charged on standard AC wall voltage or through an off board charger 22.

The battery pack 24 may also have a cord box 76. The cord box 76 may have a diagnostic receptacle 78 coupled thereto. The diagnostic receptacle 78 is in communication with the controller area network through the controller area network bus 64. Various types of diagnostic data may be provided to the diagnostic receptacle 78. The diagnostic receptacle 78 may be used to communicate the diagnostic data to the display onboard the vehicle 10 or disposed in another location such as a central monitoring system. A direct-wired connector to the receptacle may thus be provided. Alternatively, the antenna 44 may be used to wireless communicate diagnostic data to the central monitoring system 42.

The DC source 72 is coupled to a circuit breaker 80 and a fuse 82. A current sensor 84, such as a Hall Effect current sensor, may be used to measure the current to the cell pack 50. The current sensor signal 86 is communicated to the controller 66. Power from the circuit breaker 80 is provided to the power module 60 in the battery monitoring system 16 and is ultimately used to provide power to the heating elements 52.

Figure 7:
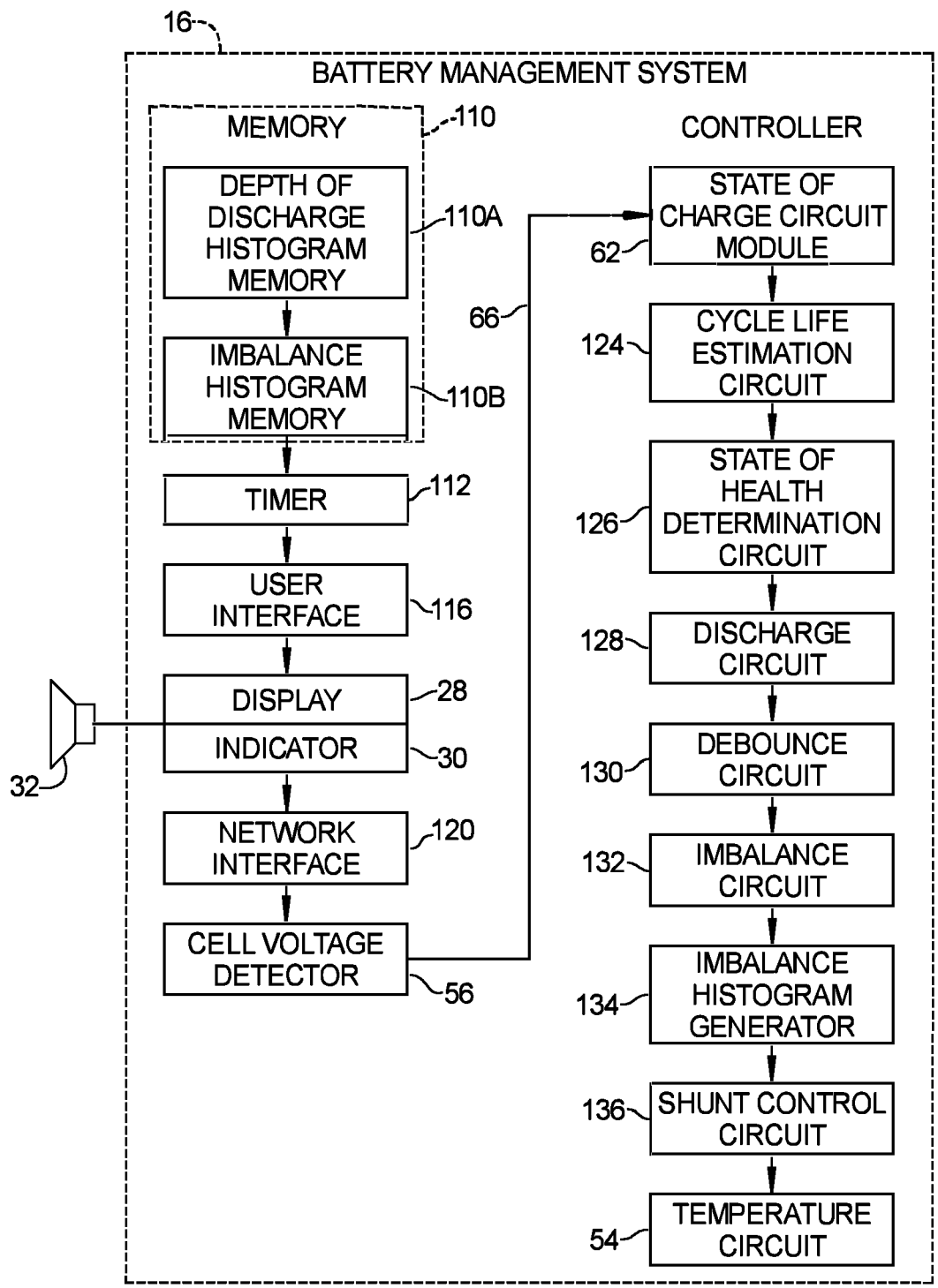
FIG. 7 is a detailed block diagrammatic view of the battery management system of FIG. 6.

Referring now to FIG. 7, the battery management system 12 is illustrated in further detail. In this example, the same components described in the figures above have the same reference numerals. The battery management system 12 has a memory 110. The memory 110 is used for storing the programming for operating the various aspects of the system. The memory 110 is also used to store a depth of discharge histogram and a depth of discharge histogram memory 110A and an imbalance histogram in the imbalance histogram memory 110B.

The battery management system 16 also has a timer 112. The timer 112 determines various aspects of time including the calendar day, calendar date and operating periods and times for timers used during operation. The timer 112 is used as an input to the histograms described above.

The battery management system 16 has a user interface 116. The user interface 116 may be implemented in a variety of forms depending upon the technical needs for the system. In one aspect, the user interface 116 may be implemented in more or more mechanical switches. The user interface 116 may also be implemented in a keyboard, a keypad or a touch screen. All of the types of interfaces may be implemented within the battery pack 24 or may be externally connected to the battery pack 24. Likewise, the user interface 116 may be implemented in or as part of the user interface of the vehicle. The user interface 116 may be user to input use data for a future time period. For new customers or new equipment for a customer, the shift data or times of use may be known. This allows the state of charge levels to be set without the learning time. The user interface 116 may also be used to answer a query. For example, if the lower limit of the set state of charged will be crossed a query to the operator may be answered to allow the operation to continue.

A network interface 120 may also be provided within the battery management system. The network interface 120 may be a wired connection through the connector 34 or wireless connection through the antenna 44. For example, the network interface 120 may be a local area network interface. A Bluetooth® interface or other wireless connection may also be part of the network interface 120. The network interface 120 allows the battery management system to communicate with off-board devices such as the control monitoring system 42 illustrated in FIG. 1.

The controller 66 is programmed to for the various functions and methods as illustrated in further detail. The controller 66 may contain the state of charge circuit module 62 for determining the state of charge of the battery pack. The state of charge is directly related to the capacity of the battery. The controller 66 may further comprise a cycle life estimation circuit 124 that is communication with a state of health determination circuit 126 and a discharge circuit 128. The cycle life estimation circuit 124, the discharge circuit 128 may provide inputs to the state of health determination circuit 126 so that a state of health may be displayed or otherwise communicated to the users of the system, such as the vehicle. The cycle life estimation circuit 124 may determine the cycle life estimation based on the average depth of discharge over the time period since the battery pack was replaced.

A debounce circuit 130 may also be disposed within the controller 128. As will be described below, when an imbalance is deleted, the debounce circuit 130 allows the system to wait to verify whether a debounce is occurring. Debounce can cause extraneous readings.

An imbalance circuit 132 is also provided within the controller 66. The imbalance circuit 132 obtains the top-of-charge cell voltages for each of the individual cells. The imbalance histogram generator 134 and the imbalance circuit 132 may be used to control a shunt control circuit 136 to reduce differences in the top-of-charge voltages at the cells 14A. The shunt control circuit 136 is used for controlling the shunting of individual cells so that a desired voltage level may be maintained throughout all of the cells. The operation of the components of the controller 66 and battery management system 16 are described in the specific methods set forth below.

Figure 8:
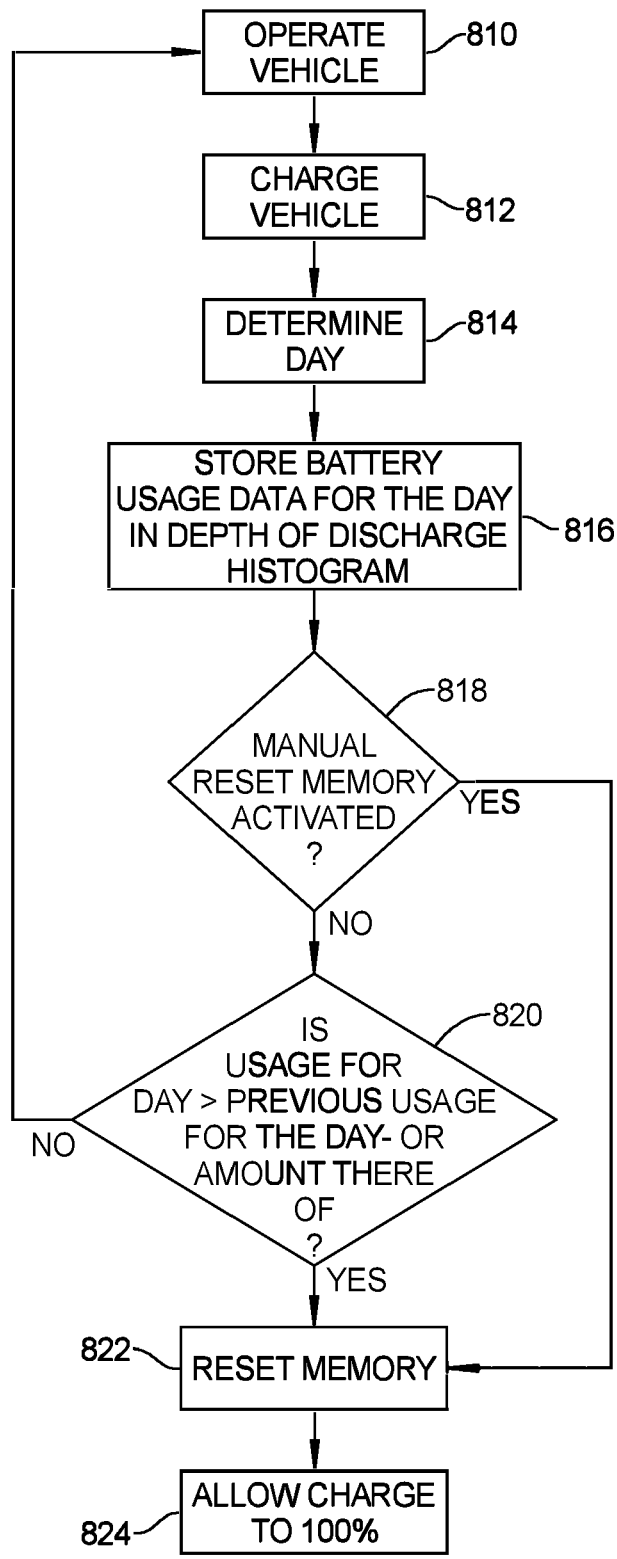
FIG. 8 is a flowchart of a method for charging the vehicle.

Referring now to FIG. 8, a method of operating the system is set forth. In this example, a vehicle is operated. During the operation of the vehicle, the battery is discharged. In step 812, the battery is charged. Charging according to the described methods can improve battery life. The charging of the vehicle is described in further detail below. In step 814, the time of day or other time data may be determined in step 814. In step 816, the usage data for the battery is stored. The usage battery data may be correlated with the calendar date or another time and/or the amount of charge or amp hours applied to the battery to recharge the battery from its discharge state. The state of charge data may also be input to the system for future use. That is, a new vehicle or an upgraded vehicle may not have memory. The user interface may communicate usage data to the system to be used to predict the state of charge. A depth of discharge histogram may be formed in step 816 and stored within the memory. In step 818, if a manual reset of the memory has not been activated, step 820 is performed. In step 820, it is determined whether the usage for the day is greater than the previous usage for the current day or a relative amount such as percentage above of the usage (either may be referred to as a usage threshold). When the usage for the current day is not greater than the usage threshold for the day, step 810 is performed. In step 820, if the usage for the current day is greater than the usage threshold, the memory may be reset in step 822. By resetting the memory, the histogram may then be reset because an obviously different application for usage of the system, such as the vehicle, is being performed. In step 824, when the system is reset, the state of charge of the vehicle allows 100% to 0% state of charge operation.

Figure 9A:
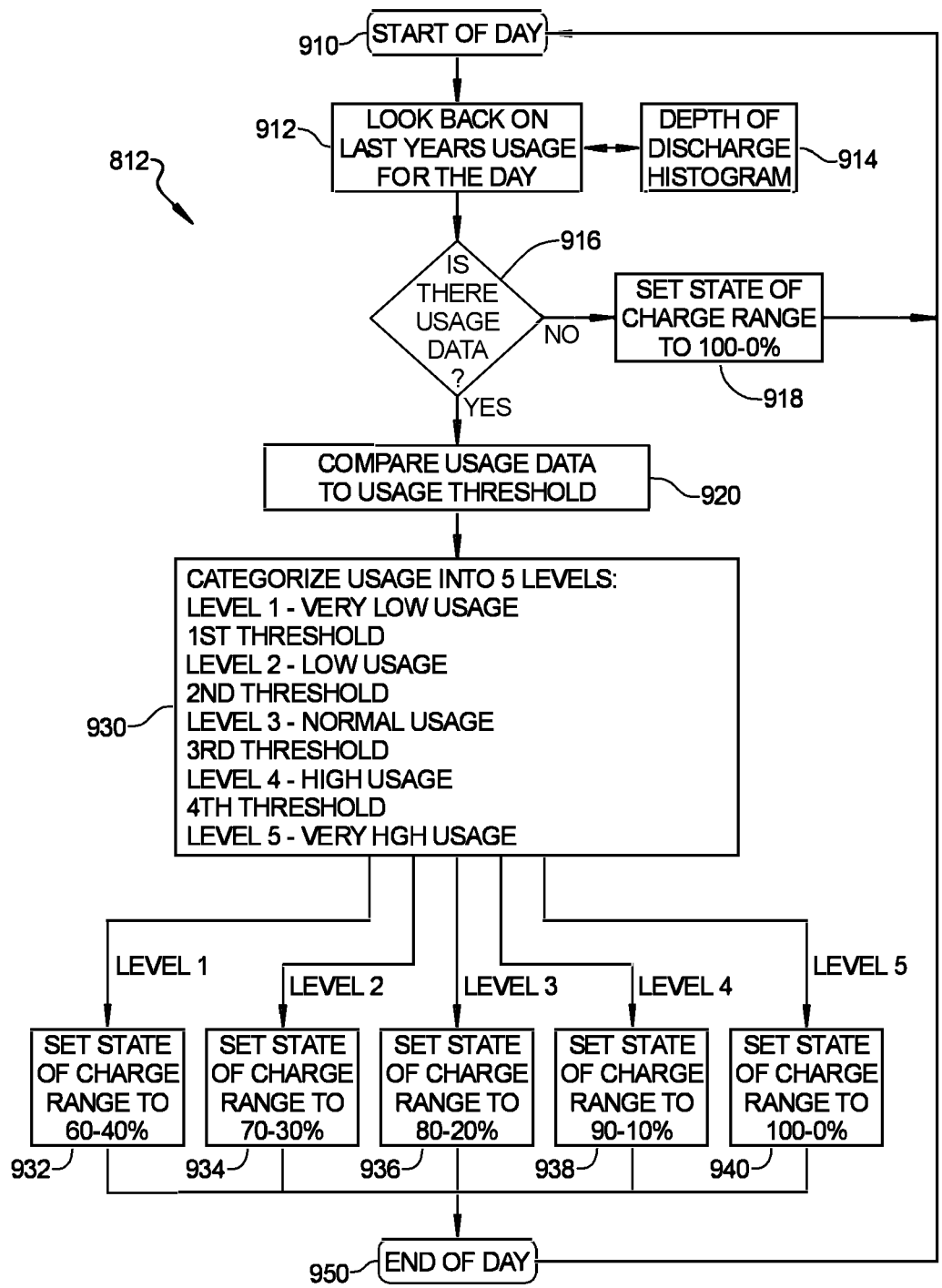
FIG. 9A is a flowchart of a method for charging the vehicle using a state of charge determined at various levels.

Referring now to FIG. 9A, a method of charging the vehicle in step 812 is illustrated in further detail. In this example, the system begins at the start of the current day in step 910. In step 912, a specific time period such as the last year of usage for the current day in question may be obtained. Another time period such as the day of the week may also be used. For example, usage for Wednesdays may be used. In step 914, the depth of discharge histogram provides the usage data for the previous usage for the current day. In step 916, it is determined whether there is usage data for the particular day or time period. When there is no usage, the state of charge may be set to operate between 100% and 0% of charge of the vehicle. After step 918, step 910 is again performed.

The usage data for the particular day is compared to a plurality of usage thresholds. In this example, four usage thresholds may be used. However, various numbers of thresholds may be used. In step 930, the level of usage is determined. In this example, a first usage threshold between level 1 and level 2, a second usage threshold between level 2 and level 3, a third usage threshold between level 3 and level 4 and fourth usage threshold between level 4 and level 5 may be used for comparison purposes. When the usage level is below the first usage threshold, very low usage in level 1 is determined. When the usage data is between the first usage threshold and the second usage threshold, level 2 or low usage is determined. When the usage is between the second usage threshold and the third usage threshold, normal usage is determined. When the usage is between the third usage threshold and the fourth usage threshold, high usage is determined. When the usage is above a fourth usage threshold, very high usage is determined. Based on the level determined, a state of charge for charging the battery is established. In step 932, a state of charge range between 60% and 40% is established in this example. Thus, the operating state of charge range is between 60% and 40% or a total of 20% of the overall possible battery charge that is centered around 50%. Step 932 corresponds to level 1, which is below the first threshold.

In step 934, a state of charge corresponding to the second level between the first threshold and the second threshold is provided. The overall range is between 70% and 30%. This corresponds to a 40% of the operating state of charge range compared to the maximum battery charge. In step 936, the state of the charge is set between 80% and 20%. This corresponds to a 60% overall range relative to a 100% battery charge, which is centered on 50%. Step 936 corresponds to level 3, which is between the second threshold and the third threshold. In step 938, the state of charge of set between 90% and 10% which is total span of 80% of the charge of the vehicle, which is center around 50%. Step 938 corresponds to a high level of usage between the third usage threshold and the fourth usage threshold. In step 940, very high usage above the fourth usage threshold has been determined. In this step, the overall range is 100% of the total battery usage. Each of the ranges in steps 932-940 are centered around 50%. The total state of charge range in each step increases from step 932 to step 940. In this example, a 20% increase in overall range has been used in each step. After steps 932-940, the day ends in step 950. After the day ends, the system restarts in step 910 for a new day. By centering the state of charge around 50%, the battery life may be increased.

In FIG. 9A, the state of charge circuit module 62 is used to perform the method. When a battery state of charge is centered on 50%, such as between weekly, yearly patterns may thus be observed and the appropriate state of charge may be obtained. Other days may be used and may be related to activity in one part of a multi-day process. One advantage of such a system is that a low amount of memory is used to perform the method. The depth of discharge histogram may be reset as illustrated in FIG. 8 when usage values are significantly out of range. A certain percentage, such as 25%, of fluctuation from the stored histogram value may be tolerated. In some applications, a smaller amount of tolerance from a previous year's volume may be used. This allows the system to be reset so that other applications of the vehicle may be learned and, in time, the battery life may be increased.

Figure 9B:
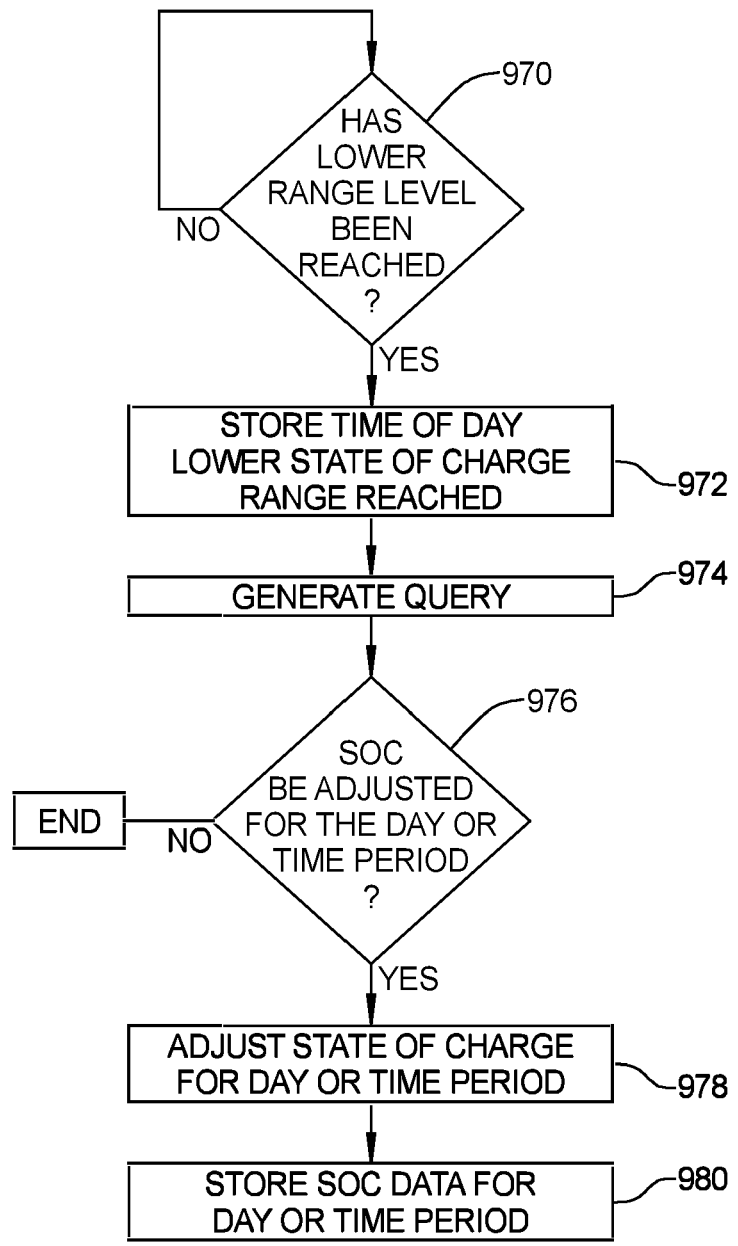
FIG. 9B is a flowchart of a method operating the charging system when the lower state of charge range is reached.

Referring now to FIG. 9B, the state of charge adjustment for a day is set forth. In step 970, the lower range level being reached is determined. When the lower range level of the state of charged is reached in step 970, step 972 stores the time of day that the lower state of charge range was reached. In step 974, the optional step of generating a query as to whether discharging should occur is performed. In step 976 when the state of charge is not to be adjusted for the day or time, the system ends. In step 976 when the state of charge is to be adjusted for the day or time, step 976 adjusts the state of charge for the day or time. After step 978, step 980 stores the state of charge data for the day or time period.

Figures 10A, 10B:
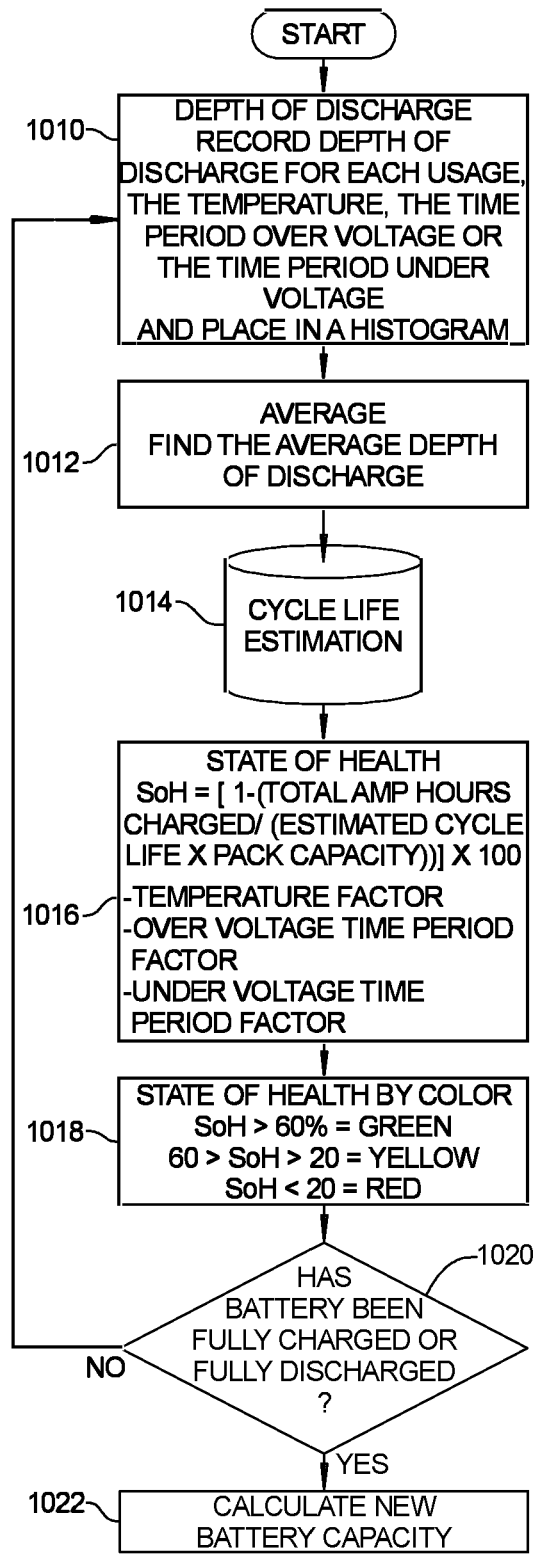
FIG. 10A is a flowchart of a method for providing an indication of the state of health of the battery pack.
FIG. 10B is a chart illustrating average depth of discharge versus the estimated life cycle that is used in the state of health determination.

Referring now to FIGS. 10A and 10B, a method for estimating the state of health and providing an indication therefor is set forth. In step 1010, the depth of discharge for each usage is placed in a histogram values. The histogram values may be determined by counting a number of times each of a plurality of thresholds is crossed. The thresholds may correspond to predetermined amounts such as every 5 percent of discharge as illustrated in the leftmost column of FIG. 10B. A count is entered as a threshold is crossed. For example, when the depth of discharge crossed from less than 15% to over 15% a count is added to the histogram. That is, the day and time may be used to store the amount of discharge for each usage. By using a count the use of the memory 110 is minimized. The amount of discharge may also be determined by the actual amount of charging applied during recharge such as an amount amp hours for each recharge. The temperature is also a factor in the in the state of health. As well, the amount or time period above a predetermined voltage or the time below a predetermined voltage will all ultimately affect the state of health and ultimately the cycle life. Based on the temperature a temperature factor, an over voltage time period factor or an under voltage time period factor may be calculated. These factors are based on the time at the temperature and the time over or under the voltage and how far outside the temperature and voltages outside limits that were reached. The three factors are determined experimentally and depend on the battery chemistry and other physical attributes of the battery cells. In step 1012, the average depth of discharge maybe determined in the discharge circuit 128. The average depth of discharge is over a predetermined time period. That is, the average depth of discharge may be determined over a time period or over the time since the last reset was performed. The depth of discharge or the average depth of discharge may be determined as a percent of discharge of the battery relative to the overall charge. The histogram described in step 1010 may count the number of times a certain charge is reached. When the average depth of discharge is determined, a cycle life estimation in step 1014 is determined. The cycle life estimation is directly related to the battery capacity. The cycle life of a battery is when the battery reaches 80% of its initial capacity. The cycle life estimation takes the average depth of discharge and determines the cycle life. As is illustrated, when the depth of discharge is 100%, the estimated cycle life corresponds to 1000. When the average depth of discharge of the battery is 5%, the estimated cycle life is 300,000 cycles. As can be seen, the lower the depth of discharge, the higher the estimated cycle life. With an average depth of discharge of 50%, 4000 cycles may be obtained by the particular battery. Of course, the table set forth in FIG. 10B is merely illustrative of one particular battery. Other battery chemistries have significantly different cycles per average depth of discharge.

In step 1016, the state of health may be determined. The state of health (SoH) may be determined by the formula: SoH=[1−(Total Amp Hours Charged/) Estimated Cycle Life×Packed Capacity 2)]×100—a temperature factor−an overvoltage time period factor−undervoltage time period factor.

The estimated cycle life is determined from the average depth of discharge and the Table 10B. The total amp hours charged is the usage in step 1010. In step 1018, a display is generated that corresponds to the state of health of the battery. In this example, three levels of the state of health are provided with three different thresholds. When the state of health is below 20%, a red indicator is provided that corresponds to a low state of health. When the state of health is between 60% and 20%, a yellow or medium amount of state of health is provided. When the state of health is greater than 60%, a green indicator is provided. Thus, three thresholds are compared to the state of health to generate the display. Of course, other numbers of thresholds may be used for determining the state of health.

In step 1020, whether the battery has been fully charged or discharged is determined. When step 1020 is true, step 1022 calculated a new battery capacity. That is, when the battery capacity is fully charged or discharged the amount of capacity can be easily determined accurately without estimation. The battery pack capacity can then be used in step 1016. The state of charge can be determined by:

$$SOH = 100 * \left(\frac{Co}{Ci}\right)$$

where Co is the current capacity and Ci is the initial capacity. In practice, the reaching of fully charge or fully discharge happens rarely and the estimation above is used in between.

One advantage of the method illustrated in FIGS. 10A and 10B is that a low amount of memory is used to store the depth of discharge and the histogram associated with the depth of discharge. The data of the state of health may be displayed in a simple light emitting diode array or communicated into a central monitoring system or on vehicles per on board system. Multicolor and multi-presentation methods may be used to communicate the data. The histogram may also be displayed in a display.

Figure 11A:
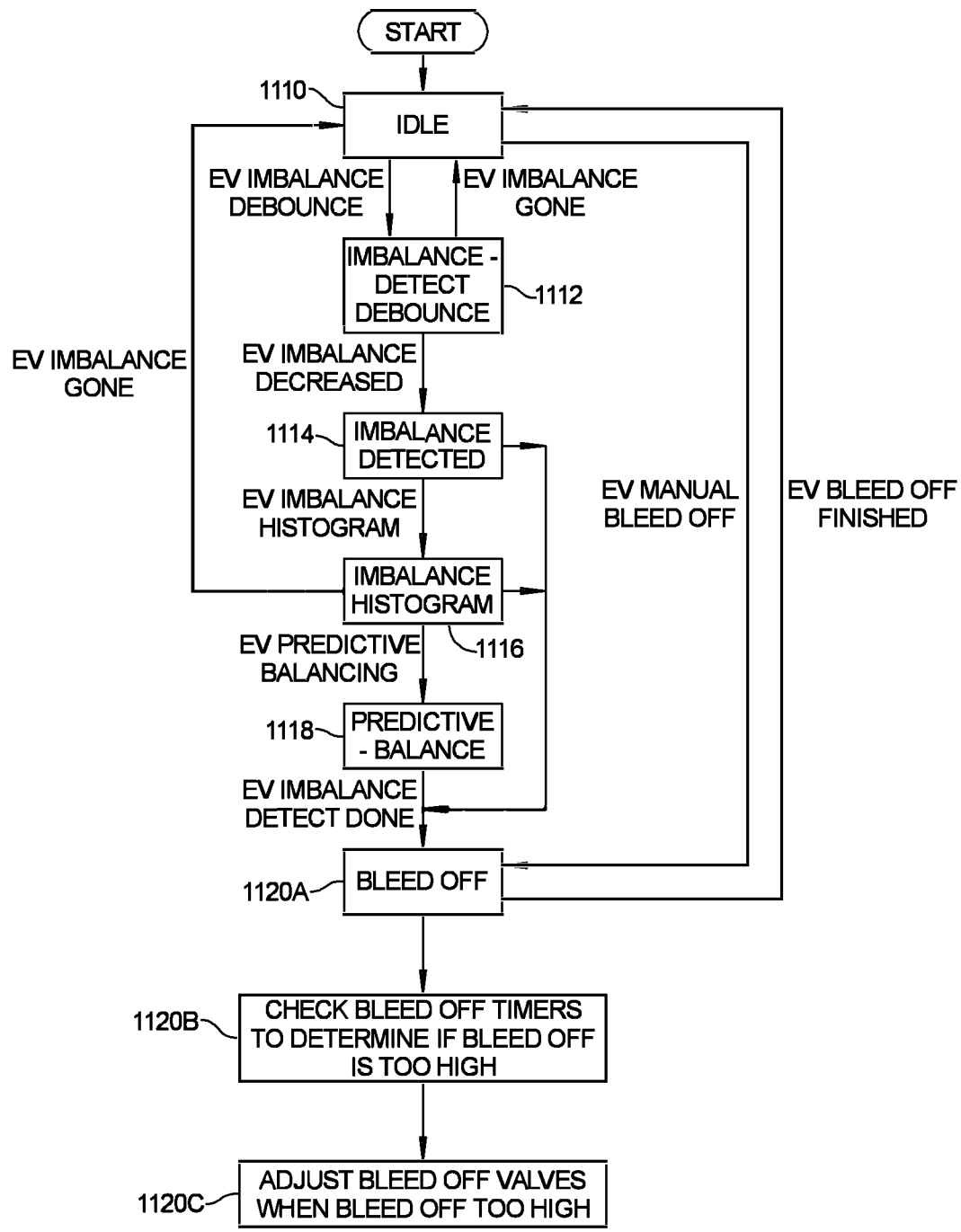
FIG. 11A is a high-level flowchart of a method for balancing the cell voltages in a battery pack.

Referring now to FIG. 11A, a high level method for balancing the top-of-charge voltages for the battery cells is set forth. Further details of the various processes within FIG. 11A are set forth below. In step 1110, the idle system is set forth. The system is idle when the charging and discharging or shunting process is complete. In step 1110, the idle system is checked to determine if any of the cell voltages are above an imbalance threshold (or the lowest imbalance threshold when a plurality of imbalance thresholds are used. Each of the cells have a top-of-charge and bottom-of charge voltage associated therewith. One or both of the top-of-charge voltage or the bottom-of-charge voltage may be used in the process. Each voltage is compared to the imbalance threshold. Details of the high-level method is set forth in FIG. 11B, provided below. When an imbalance is detected in step 1110, step 1112 performs a debounce procedure by initiating a debounce timer and waiting until the time expires before confirming the condition. In one example, 30 seconds was used as the debounce timer. When at least one of the cells is above an imbalance threshold, step 1114 is performed. In step 1114, imbalance is detected. In step 1112, if no imbalance is detected, step 1110 is again performed. In step 1114, an imbalance level and corresponding imbalance factor is determined. The imbalance level and corresponding factor are ultimately used to set a shunt or bleed off time to correct the imbalance. Generally, the highest level achieve is used in the correction. That is, each time a higher level of imbalance is achieved that higher level is stored in the memory.

If an imbalance is detected, an imbalance histogram is generated in step 1116. If in step 1116, when the imbalance is gone, step 1110 is again performed. If the sum of the histogram values is greater than a predictive balancing threshold, step 1118 is performed. In step 1118, predictive balancing is performed which checks the histogram for the highest cell values within a percentage of the highest value. Permanent shunt timers are then set at the lowest shunt time value of the group of imbalanced battery cells for use during shunting as will be described in more detail below. By setting permanent shut timers, the system is adjusted so that less continual adjustment is necessary. Permanent shunt values are needed because of different self-discharging rates of the cells, the internal impedances are different and the temperatures that the cells are exposed to are different in different parts of the battery pack. Permanent adjustment compensates for life cycle changes. After step 1118, step 1120A is performed. Step 1120A is also performed when the imbalance levels are not all equal in step 1116. In step 1120A, the bleed off (shunt) timers are set so that bleed off or shunting is performed for the shunt of bleed-off times to reduce voltage imbalance. Shunt flags may be set if any of the bleed off timers have time remaining. In step 1120B the bleed off times are checked to determine if bleed off is too high. Step 1120B is used to determine if too much bleed off is being performed. In step 1120C, the bleed off values (timer values) are adjusted lower when bleed off is too high. After step 1120C and the bleed off process is performed, the system restarts again in step 1110.

Referring now to FIG. 11B, steps 1110 and 1112 are illustrated in further detail. In step 1122, the charging of a plurality of cells is performed. In step 1124, the charging of the cells is ended. In step 1126, a manual bleed off process may be triggered if one of the bleed off timers is greater than zero.

In step 1128, the voltage is measured for each of the battery cells. In step 1130, the voltages for each of the cells is compared to an imbalance threshold. There may be several imbalance thresholds as described below. However, one imbalance threshold or the lowest imbalance threshold of a plurality of imbalance thresholds may be used. The cell voltages are compared to the lowest imbalance threshold when more than one threshold is used. When none of the cell voltages is above the lowest imbalance threshold, no imbalance is found and thus step 1122 is again performed. In step 1130, when at least one of the cells is above the lowest imbalance threshold, step 1132 initiates a debounce process.

The debounce process is used to ensure an accurate reading is performed for the cell voltage. The debounce process sets a debounce timer in step 1134 to wait a predetermined time and again determine the cell voltages. In step 1136, when all of the cell voltages are below the imbalance threshold or the shunt timers have expired, step 1122 is performed. In step 1136, when at least one of the cell voltages is above the imbalance threshold, an imbalance procedure is performed in step 1138.

In FIG. 11C, the previously mentioned levels of imbalance are set forth. In this example, a first imbalance threshold, a second imbalance threshold and a third imbalance threshold separate the imbalance factors. Below the first imbalance threshold, level 0, the imbalance factor is 0. The time factor associated with level 0 is 0 time factor indicating no shunting time is needed. Above the first imbalance threshold, at level 0 and below the second imbalance threshold at level 1, a first imbalance factor 1 is established. The time factor in this example is 0.050%. Above a second imbalance threshold at level 1 and below a second imbalance threshold at level 2 is an imbalance factor of 2. This corresponds to a time factor of 0.225%. Above the third imbalance threshold, an imbalance factor of 3 is established. A time factor of 0.225% is provided for the imbalance factor of 3. In this example, a lithium iron phosphate battery is used. The first imbalance threshold is 3.40 volts, the second imbalance threshold is 3.55 volts and the third balance threshold is 3.65 volts.

Figure 11D:
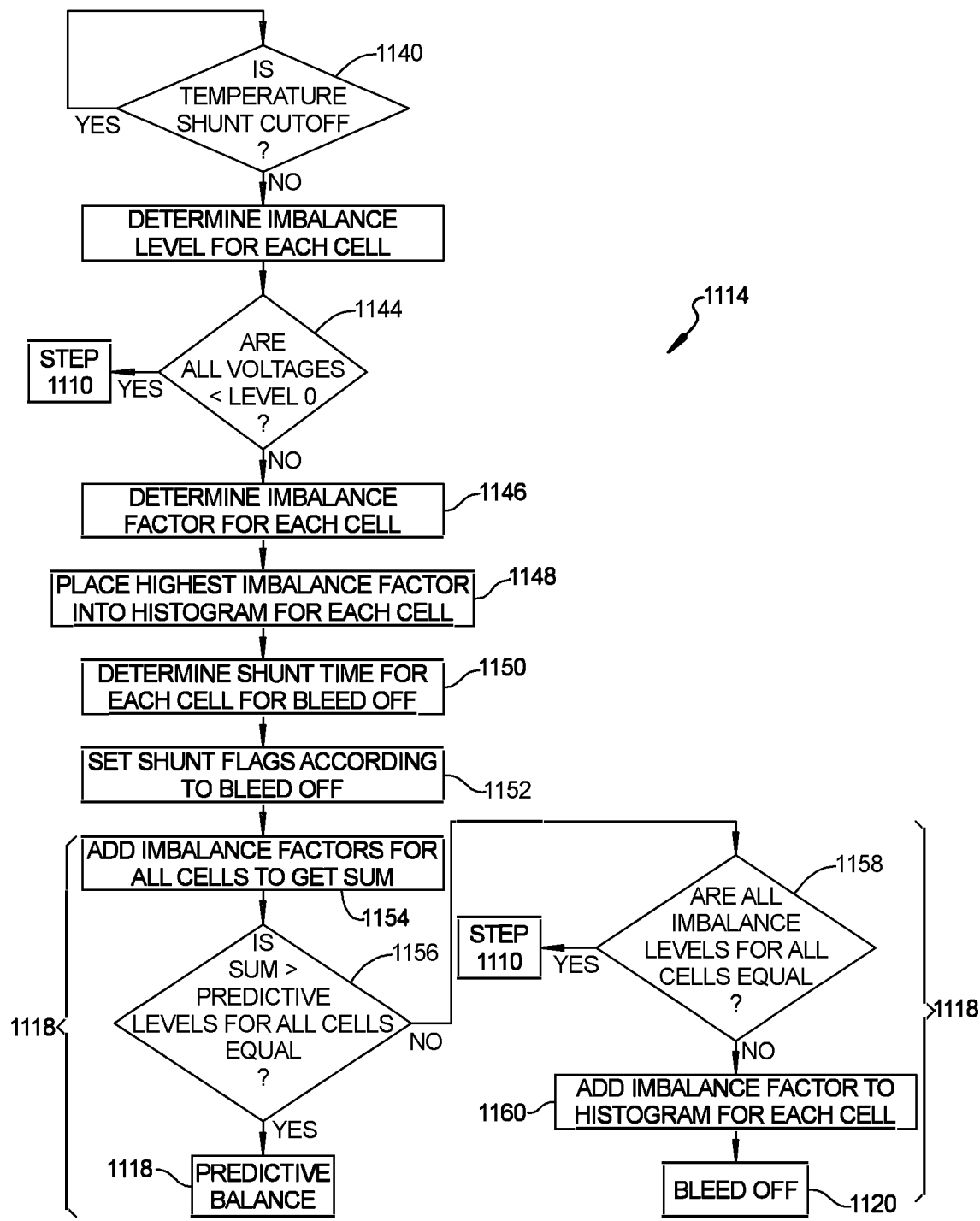
FIG. 11D is a detailed flowchart of steps 1114 and 1116 of FIG. 11A.

Referring now to FIG. 11D, if the temperature is greater than a shunt cutoff temperature threshold, step 1140 is performed to wait until the temperature drops below the shunt cutoff temperature threshold. After step 1140, when the temperature is less than the shunt cutoff temperature threshold, step 1142 is performed. In step 1142, the imbalance level for each cell is determined. The imbalance level is determined for each cell using the chart illustrated in FIG. 11C. An imbalance factor and a time factor may be obtained by the system. In step 1144, if all of the voltages are less than the level 0 threshold, the system returns to step 1110 which corresponds to step 1122 of FIG. 11B.

When not all of the cells are less than level 0, step 1146 is performed. An imbalance factor using the chart above is determined for each cell. In step 1148, the highest imbalance factor is placed into a histogram for each cell. That is, when a higher balance factor is determined by comparing the comparing the voltage to the various thresholds and another threshold higher is crossed, the higher imbalance factor is stored in a histogram. A shunt time for each cell for bleeding off or shunting is determined in step 1150. Shunt flags are set according to the bleed off time set in step 1156. In step 1154, an imbalance factor for all the cells is obtained to get the sum. When the sum of the imbalance factors for all the cells is greater than a predictive balancing threshold in step 1156, predictive balancing is performed in step 1118.

This will be described in more detail in FIG. 11E. When the sum is not greater than the predictive balancing threshold in step 1156, step 1158 determines if all the imbalance levels for all the cells are equal. When the imbalance levels for all the cells are equal, step 1110 is repeated. When the imbalance levels for all of the cells are not equal, step 1160 is performed. An imbalance factor is added to the histogram for each cell in the imbalance histogram generator 134. One is added to imbalance level 0, two is added to imbalance level 1, and three is added to imbalance level 2 to provide a histogram that includes each cell. The bleed off step 1120 is performed after steps 1114 and 1116.

Figure 11E:
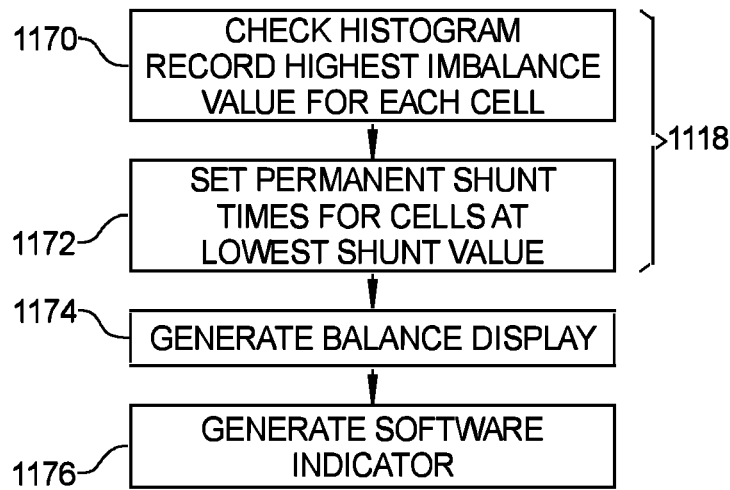
FIG. 11E is a flowchart of the predicting balancing step 1118 of FIG. 11A.

Referring now to FIG. 11E, step 1118 is described in further detail. Step 1118 is performed when, in step 1116, the histogram sum is greater than a predictive balancing threshold after step 1156. In step 1170, the histogram highest values are recorded that are a highest value for each cell in the imbalance histogram generator 134. In step 1172, a permanent shunt times are set for the battery cells at the lowest shunt value in the shunt control circuit 136. The permanent shunt timers are used during the charging process. This will allow the balance to occur naturally if each of the shunt timers are set at the proper levels. The system is iterative and therefore repeated so that shunt values may be adjusted over time. In step 1174 an imbalance display is generated like that in FIG. 4E. The balance display provides an indicator as to how many cells are imbalance. In step 1174 an imbalance display is generated like that in FIG. 4E, for example. The balance display provides an indicator as to how many cells are imbalance (the number of cells with shunt timers). Colors such as red may indicate a balance level 3, yellow an imbalance level of 2 and green an imbalance level of 1 or less. A display may also be generated at the central monitoring system. Colors such as red may indicate a balance level 3, yellow an imbalance level of 2 and green an imbalance level of 1 or less. In step 1176 a software indicator is generated.

Figure 11F:
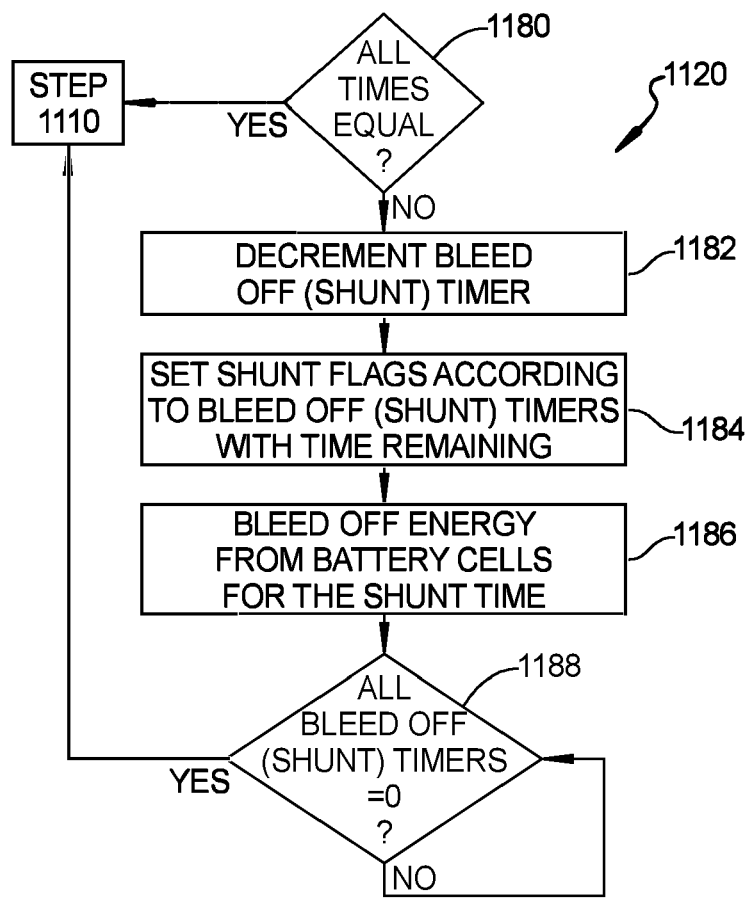
FIG. 11F is a flowchart of a method for bleeding off excess charge of step 1120 of FIG. 11A.

Referring now to FIG. 11F, in step 1180, it is determined whether all of the timers are equal. When all of the shunt timers are equal, there is no imbalance and step 1110 is performed. In step 1180, when all of the timers are not equal, the shunt timers may be decremented when needed in step 1182. The bleed off timers need to be decremented when the conditions permit. In step 118, the shunt flags are set according to any bleed off timers with time on them. In step 1186, when all of the shunt timers are 0, in step 1186, step 1110 is performed.

In the above-mentioned method, the rate of self-discharge is calculated based on the amount of energy over a certain amount of time is used. The rate of self-discharge is used in the determination of the shunt time. The rate of self-discharge becomes the rate of adjustment for the cell by controlling the timing of the shunts. The imbalance shunt time is based on one or more of the associated imbalance factor, the cell capacity and a shunt duty cycle Methods of FIGS. 11A-11EF are continually performed to provide shunt times to improve the charge balance of the system.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. Each module may include and/or be implemented as a computing device, which may be implemented in analog circuitry and/or digital circuitry. Further, the computing device may include a microprocessor or microcontroller that performs instructions to carry out steps performed by various system components.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The computer-readable medium and/or memory disclosed herein may include, for example, a hard drive, Flash memory, radon access memory (RAM), programmable read only memory (PROM), electrically erasable programmable read only memory (EEPROM), read only memory (ROM) phase-change memory and/or other discrete memory components.

In this application, apparatus elements described as having particular attributes or performing particular operations are specifically configured to have those particular attributes and perform those particular operations. Specifically, a description of an element to perform an action means that the element is configured to perform the action. The configuration of an element includes providing the hardware and optionally the software to perform the corresponding action in addition to the hardware provided. Examples of the structure that may be used to perform the corresponding action are provided throughout the specification and illustrated by the provided drawings. See the examples of the defined structure disclosed by the modules, devices, elements and corresponding methods described herein. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for." Examples are provided so that this disclosure will be thorough, and will fully convey the scope to those who are skilled in the art. Numerous specific details are set forth such as examples of specific components, devices, and methods, to provide a thorough understanding of the examples of the present disclosure. It will be apparent to those skilled in the art that specific details need not be employed, that examples may be embodied in many different forms and that neither should be construed to limit the scope of the disclosure. In some example examples, well-known processes, well-known device structures, and well-known technologies are not described in detail.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of controlling charging of a plurality of battery cells comprising:
   determining a top-of-charge voltage or a bottom-of-charge voltage for each of the plurality of battery cells;
   comparing the top-of-charge voltage or the bottom-of-charge voltage for each of the plurality of battery cells to an imbalance threshold;
   determining a first battery cell of the plurality of battery cells is above the imbalance threshold by an imbalance amount;
   determining an imbalance shunt time for the first battery cell based on the imbalance amount;
   discharging the first battery cell for the imbalance shunt time toward the imbalance threshold;
   storing imbalance factors for plurality of cells in a histogram to form histogram values;
   summing histogram values from the histogram to form a sum and when the sum is greater than a predictive balancing trigger, setting a permanent shunt for use as the imbalance shunt time.

2. The method of claim 1 wherein determining the first battery cell is the imbalance amount above the imbalance threshold comprises determining the first battery cell is above the imbalance amount when a circuit temperature is below a temperature threshold.

3. The method of claim 1 further comprising after determining the first battery cell is above the imbalance threshold, waiting a debounce time period and repeating the steps of determining the top-of-charge voltage or bottom-of-charge voltage and comparing the top-of-charge voltage or bottom-of-charge voltage after the debounce time period.

4. The method of claim 1 wherein the imbalance threshold comprises a first imbalance threshold, a second imbalance threshold and a third imbalance threshold, assigning a first imbalance factor below the first imbalance threshold, a second imbalance factor above the first imbalance threshold and below the second imbalance threshold, a third imbalance factor above the second imbalance threshold and below the third imbalance threshold and a fourth imbalance factor above the third imbalance threshold.

5. The method of claim 4 wherein comparing the top-of-charge voltage or bottom-of-charge voltage for each of the cells to the first imbalance threshold, the second imbalance threshold and the third imbalance threshold and determining an associated imbalance factor based on comparing and wherein determining the imbalance shunt time comprises determining the imbalance shunt time based on the associated imbalance factor.

6. The method of claim 5 wherein determining the imbalance shunt time comprises determining the imbalance shunt time based on the associated imbalance factor and a cell capacity.

7. The method of claim 5 wherein determining the imbalance shunt time comprises determining the imbalance shunt time based on the associated imbalance factor, a cell capacity and a shunt duty cycle.

8. The method of claim 1 further comprising generating a battery balance display indicating a battery balance for the plurality of battery cells.

9. A system for controlling charging of a plurality of battery cells comprising:
   a cell voltage detector determining a top-of-charge voltage or bottom-of-charge voltage for each of the plurality of battery cells;
   an imbalance circuit comparing the top-of-charge voltage or bottom-of-charge voltage for each of the plurality of battery cells to an imbalance threshold and determining a first battery cell of the plurality of battery cells is above the imbalance threshold by an imbalance amount;
   a shunt control circuit determining an imbalance shunt time for the first battery cell based on the imbalance amount and controlling discharging the first battery cell for the imbalance shunt time toward the imbalance threshold; and an imbalance histogram generator storing imbalance factors for plurality of cells in a histogram comprising histogram values, the imbalance histogram generator summing the histogram values from the histogram to form a sum and when the sum is greater than a predictive balancing trigger, the shunt control circuit setting a permanent shunt for use as the imbalance shunt time.

10. The system of claim 9 wherein the imbalance circuit determines the first battery cell is the imbalance amount above the imbalance threshold a circuit temperature is below a temperature threshold.

11. The system of claim 9 further comprising a debounce circuit waiting a debounce time period after determining the first battery cell is above the imbalance threshold and the imbalance circuit repeating the steps of determining the top-of-charge voltage and the bottom-of-charge voltage and comparing the top-of-charge voltage and the bottom-of-charge voltage after the debounce time period.

12. The system of claim 9 wherein the imbalance threshold comprises a first imbalance threshold, a second imbalance threshold and a third imbalance threshold, assigning a first imbalance factor below the first imbalance threshold, a second imbalance factor above the first imbalance threshold and below the second imbalance threshold; a third imbalance factor above the second imbalance threshold and below the third imbalance threshold and a fourth imbalance factor above the third imbalance threshold.

13. The system of claim 12 wherein the imbalance circuit compares the top-of-charge voltage for each of the plurality of battery cells to the first imbalance threshold, the second imbalance threshold and the third imbalance threshold and determining an associated imbalance factor based on comparing and wherein the shunt control circuit determines the imbalance shunt time based on the associated imbalance factor.

14. The system of claim 13 wherein the imbalance shunt time is based on the associated imbalance factor and a cell capacity.

15. The system of claim 13 wherein the imbalance shunt time is based on the associated imbalance factor, a cell capacity and a shunt duty cycle.

16. A computer-readable storage medium storing instructions that when executed by a computer cause the computer to perform a method for using a computer system to control a battery management system associated with a plurality of battery cells, the method comprising:

determining a top-of-charge voltage for each of the plurality of battery cells;

comparing the top-of-charge voltage for each of the plurality of battery cells to an imbalance threshold;

determining a first battery cell of the plurality of battery cells is above the imbalance threshold by an imbalance amount;

determining an imbalance shunt time for the first battery cell based on the imbalance amount;

discharging the first battery cell for the imbalance shunt time toward the imbalance threshold;

storing imbalance factors for plurality of cells in a histogram to form histogram values; and summing histogram values from the histogram to form a sum and when the sum is greater than a predictive balancing trigger, setting a permanent shunt for use as the imbalance shunt time.

\* \* \* \* \*